US005434548A

United States Patent [19]

Thompson et al.

[11] Patent Number: 5,434,548

[45] Date of Patent: Jul. 18, 1995

[54] COAXIAL-WAVEGUIDE ROTARY COUPLING ASSEMBLAGE

[75] Inventors: James H. Thompson, Carlsbad; Randolph E. Standke; Thomas R. Pierce, both of San Diego, all of Calif.

[73] Assignee: Qualcomm Incorporated, San Diego, Calif.

[21] Appl. No.: 218,169

[22] Filed: Mar. 28, 1994

[51] Int. Cl.[6] .......... H01P 1/06; G02B 6/36

[52] U.S. Cl. .......... 333/261; 333/26; 333/256; 333/257; 385/26; 385/25

[58] Field of Search .......... 385/26, 25, 27, 100, 385/101, 102; 333/256, 257, 261, 26, 248; 343/763; 370/104.1

[56] References Cited

U.S. PATENT DOCUMENTS

| | | | |
|---|---|---|---|
| 2,556,087 | 6/1951 | Iams | 250/33.65 |
| 2,721,263 | 10/1955 | Spencer | 343/780 |
| 3,071,768 | 1/1963 | Dunbar | 343/754 |
| 3,085,201 | 4/1963 | Kendall et al. | 325/16 |
| 3,086,205 | 4/1963 | Berkowitz | 343/754 |
| 3,212,095 | 10/1965 | Ajioka | 343/780 |
| 3,226,722 | 12/1965 | Yang | 343/780 |
| 3,756,091 | 9/1973 | Miller | 74/231 |
| 3,852,762 | 12/1974 | Henf et al. | 343/780 |
| 4,103,262 | 7/1978 | Woodward | 333/256 X |
| 4,298,850 | 11/1981 | Pellerin et al. | 333/257 |
| 4,329,692 | 5/1982 | Brunner | 343/780 |
| 4,345,257 | 8/1982 | Brunner | 343/780 |
| 4,398,791 | 8/1983 | Dorsey | 385/26 |
| 4,667,205 | 5/1987 | Gehin | 343/786 |
| 4,876,554 | 10/1989 | Tubbs | 343/780 |
| 4,979,170 | 12/1990 | Gilhousen et al. | 370/104.1 |
| 5,140,289 | 8/1992 | Andrieu et al. | 385/26 |

FOREIGN PATENT DOCUMENTS

| | | | |
|---|---|---|---|
| 1095355 | 10/1981 | France | 343/786 |

*Primary Examiner*—Frank Gonzalez
*Assistant Examiner*—Phan T. H. Palmer
*Attorney, Agent, or Firm*—Russell B. Miller; Katherine W. White

[57] ABSTRACT

A coaxial-waveguide assemblage is disclosed herein of the invention includes a first coaxial transmission line having a first inner and a first outer conductor. The inventive assemblage further includes a waveguide electromagnetically coupled to the first coaxial transmission line, where an inner surface of the waveguide bounds a signal propagation space. The waveguide is also electromagnetically coupled to a second coaxial transmission having a second inner and a second outer conductor. The inner conductor of the second coaxial transmission line is disposed to rotate about a first vertical axis, thereby enabling the second coaxial transmission line to be connected to a rotating antenna. In a particular implementation the coaxial-waveguide assemblage is disposed within a rotary joint operative to couple electromagnetic energy between first and second signal ports. An axially elongated dielectric sleeve, disposed about the second inner conductor, will preferably be dimensioned to extend into the waveguide propagation space. The rotary joint will generally include a bearing arrangement interposed between the second outer conductor and the axially elongated dielectric sleeve of the second coaxial transmission line. Tuning of the coaxial-waveguide assemblage is facilitated by a tuning cavity in communication with the propagation space.

19 Claims, 3 Drawing Sheets

COAXIAL-WAVEGUIDE ROTARY COUPLING ASSEMBLAGE

BACKGROUND OF THE INVENTION

I. Field of the Invention

The present invention relates generally to component assemblages for facilitating electromagnetic communication between a pair of coaxial transmission lines, at least one of which is adapted to rotate about a longitudinal axis. More particularly, the present invention relates to a novel component assemblage in which a waveguide structure is used to couple electromagnetic energy between the pair of coaxial transmission lines.

II. Description of the Related Art

In certain satellite communication systems, such as is described in U.S. Pat. No. 4,979,170, entitled ALTERNATING SEQUENTIAL HALF DUPLEX COMMUNICATION SYSTEM, which is assigned to the assignee of the present invention and is herein incorporated by reference, communication is maintained between a terrestrial control station and a large number of mobile units through satellite repeaters. Each mobile unit is equipped with a communications transceiver for processing information signals exchanged with various ones of the satellite repeaters. Since the orientation of each mobile unit transceiver relative to a given satellite repeater will vary as the mobile unit changes direction during terrestrial navigation, each mobile unit transceiver will preferably include a rotating antenna for providing omnidirectional signal transmission and reception. Rotation of the mobile unit antenna requires that a rotary joint be provided to enable connection of the mobile unit signal processing electronics to the rotating antenna.

Referring to FIG. 1, there is shown a cross-sectional view of a conventional rotary joint 10 operative to facilitate communication between a rotating coaxial transmission line 14 and a fixed coaxial transmission line 18. The transmission line 14 is coupled to an antenna (not shown), and includes an inner conductor 19 disposed to rotate together with the antenna about a vertical axis V. The fixed transmission line 18 is coupled to transmit/receive networks (not shown) within the mobile unit. As is indicated by FIG. 1, electromagnetic energy is coupled between the transmission lines 14 and 18 through a quarter-wavelength choke 22. That is, the choke 22 is selected to be of a length L equivalent to a quarter-wavelength ($\lambda/4$). As is well known, the choke 22 serves to provide coupling between the transmission lines 14 and 18.

The choke 22 is seen to include a small diameter quarter-wavelength finger 26 of the inner conductor 19 of the transmission line 14. The finger 26 is circumscribed by a radial cavity defined by a conductive segment 34 of the inner conductor 38 of transmission line 18. The choke 22 further includes a quarter wavelength tubular section 42 extending from a tubular outer conductor 46 of the transmission line 18. The quarter wavelength section 42 circumscribes a portion of an outer conductor 50 of transmission line 14.

Several characteristics of the choke 22 tend to disadvantage performance of the rotary joint 10. For example, the small diameter of the finger 26 renders this element susceptible to damage resulting from vibration accompanying terrestrial movement of the mobile unit. Similarly, precise tolerances are required to be maintained between the finger 26 and surrounding radial cavity defined by conductor 34, as well as between the quarter wavelength section 42 and the outer conductor 50 of transmission line 14. This increases manufacturing cost, and makes the joint 10 further susceptible to damage resulting from mechanical vibration. Finally, the $\lambda/4$ length of the choke 22 may be undesirable in applications requiring a rotary joint of relatively small axial dimension.

As is described hereinafter, the present invention provides a rotary coupling assemblage designed to obviate the disadvantages associated with conventional rotary joints.

SUMMARY OF THE INVENTION

In summary, the coaxial-waveguide assemblage of the invention includes a first coaxial transmission line having a first inner and a first outer conductor. The inventive assemblage further includes a waveguide electromagnetically coupled to the first coaxial transmission line, where an inner surface of the waveguide bounds a signal propagation space. The waveguide is also electromagnetically coupled to a second coaxial transmission having a second inner and a second outer conductor. The inner conductor of the second coaxial transmission line is disposed to rotate about a first vertical axis, thereby enabling the second coaxial transmission line to be connected to a rotating antenna.

In a particular implementation the coaxial-waveguide assemblage is disposed within a rotary joint operative to couple electromagnetic energy between first and second signal ports. An axially elongated dielectric sleeve, disposed about the second inner conductor, will preferably be dimensioned to extend into the waveguide propagation space. The rotary joint will generally include a bearing arrangement interposed between the second outer conductor of the second coaxial transmission line and the first outer conductor of the first coaxial transmission line. Tuning of the coaxial-waveguide assemblage is facilitated by a waveguide tuning cavity in communication with the waveguide propagation space.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENT

Figure 2A:
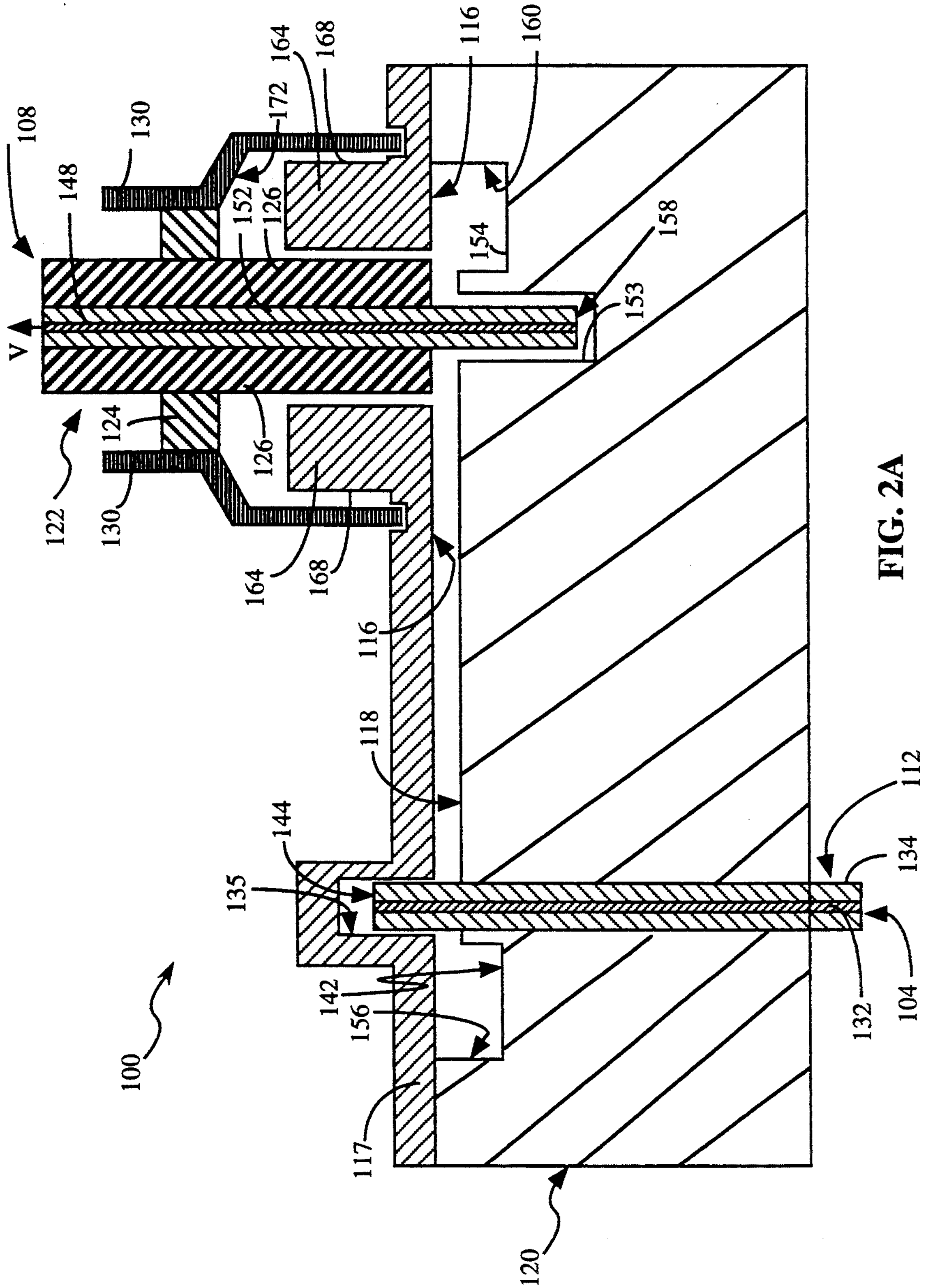
FIG. 2A depicts a side cross-sectional view of a rotary joint in accordance with the invention.
Figure 2B:
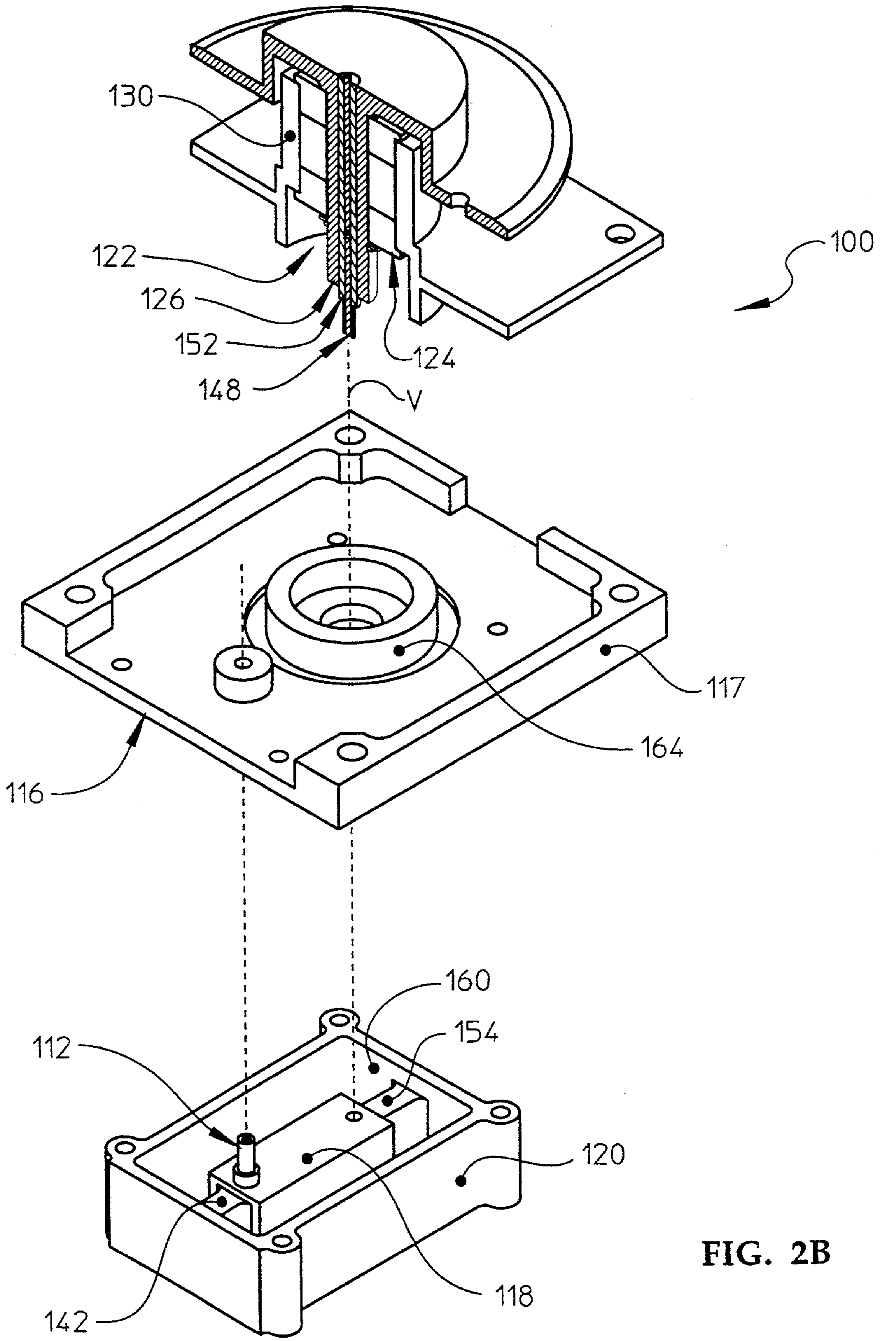
FIG. 2B shows a partially disassembled view of the rotary joint of FIG. 2A.

Referring now to FIGS. 2A and 2B, there are respectively shown side cross-sectional and partially disassembled views view of a rotary joint 100 for coupling electromagnetic energy between first and second signal ports 104 and 108 in accordance with the invention. The rotary joint 100 is seen to include a coaxial-waveguide assemblage comprising a fixed coaxial transmission line 112 electromagnetically coupled to a ridged waveguide. The ridged waveguide is partially defined by an inner surface 116 of a waveguide cover 117 (i.e., the upper waveguide surface), and by a first ridged surface 118 transverse to the plane of FIG. 2A. The first ridged surface 118 is seen to be defined by a rotary joint housing 120. A pair of opposing sidewalls (not shown) form the remainder of an inner waveguide surface bounding a propagation space between the fixed coaxial transmission line 112 and a rotating coaxial transmission line 122. In the preferred embodiment the input coaxial line 112 and ridged waveguide both exhibit a characteristic impedance of approximately 50Ω. Although the implementation of the coaxial-waveguide assemblage described herein is designed for operation in the microwave range, it is understood that the teachings of the present invention are equally applicable to operation at other wavelengths (e.g. millimeter wave).

In an exemplary embodiment the second signal port 108 is electrically connected to a rotating antenna apparatus (not shown), thereby causing the coaxial transmission line 122 to rotate about a vertical axis V. Rotation of the coaxial transmission line 122 is facilitated by a bearing arrangement 124 interposed between an outer conductor 126 of the rotating transmission line 122 and a fixed vertical flange 130. Electromagnetic energy transmitted and/or received by the antenna apparatus propagates between the fixed and rotating coaxial transmission lines 112 and 122. In the exemplary embodiment the first signal port 104 is connected to transmit and/or receive electronics (not shown).

Referring again to FIGS. 2A and 2B, the first coaxial transmission line 112 includes a first inner conductor 132 encapsulated by a first axially elongated dielectric sleeve 134. In a preferred embodiment the dielectric sleeve 134 is fabricated from a material (e.g., Teflon) having a relative dielectric constant ($E_r$) of approximately two. The rotary joint housing 120 is seen to serve as an outer conductor of the fixed coaxial transmission line 112. As shown in FIG. 2A, the first inner conductor 132 and dielectric sleeve 134 extend into the waveguide propagation space through an aperture defined by the first ridge surface 118 and a second ridge surface 142. In accordance with the invention, an outer surface of the dielectric sleeve 134 and a cylindrical bore defined by an inner surface 135 of the waveguide cover 117 form an open-circuited segment of coaxial line. As is indicated by FIG. 2, an open-circuited end 144 of the first coaxial transmission line 112 is separated by an air gap from the cylindrical bore 135.

The second coaxial transmission line 122 similarly includes a second inner conductor 148 encapsulated by a second axially elongated dielectric sleeve 152. As is indicated by FIG. 2, the second inner conductor 148 and second dielectric sleeve 152 extend into the waveguide propagation space through an aperture defined by the first ridge surface 118 and a third ridge surface 154. In accordance with the invention, the outer surface of the dielectric sleeve 152 and a cylindrical bore defined by a bored surface 153 of the housing 120 form a second open circuited coaxial line in series with coaxial line 122. An open-circuited end 158 of the second coaxial transmission line 122 is seen to be separated by an air gap from the bored surface 153. In an exemplary embodiment designed for operation over the 3.7 to 6.4 GHz range, the cylindrical bores defined by the surfaces 135 and 153 are of cross-sectional diameters of 0.108" and 0.096", respectively. In the exemplary embodiment the dielectric sleeves 134 and 152 are respectively of diameter 0.106" and 0.094" so as to closely conform to the dimensions of the surrounding cylindrical bores.

As is explained below, the present invention provides a unique method of establishing electrical connection between the inner and outer conductors of the first and second coaxial transmission lines 112 and 122 and the conductors comprising the ridged waveguide, i.e., the ridge surface 118 and the inner surface 116 of waveguide cover 117. As is indicated by FIG. 2A, a direct electrical connection exists between the outer conductor of the first coaxial transmission line 112 and the ridge surface 118, since both of these structures are defined by the housing 120. A similar metal-to-metal contact does not exist, however, between the open-circuited inner conductor 132 and the inner waveguide surface 116. As is discussed below, a first tuning cavity defined by a short circuited section of ridge waveguide is designed to appear as an open circuit (at the center operating frequency $f_o$) in shunt with ridge waveguide section 118, and to appear as a reactance at frequencies deviating from $f_o$. The first tuning cavity is defined by the inner surface 116 of the waveguide cover 117, the second ridge surface 142 and by a vertical end surface 156 of the ridge waveguide.

In accordance with the invention, the first waveguide tuning cavity and the open-circuited coaxial line defined in part by the bored surface 135 facilitate the transition between the ridged waveguide and the coaxial line 112. Specifically, these elements compensate for the inductance introduced by the section of the inner conductor spanning the waveguide propagation space bounded by the ridge surface 118 and the waveguide cover 117. In the preferred embodiment the length of the first tuning cavity in the direction transverse to the vertical axis V is selected to be equivalent to a quarter-wavelength of a predetermined microwave center carrier frequency. In the preferred embodiment the first tuning cavity is designed to exhibit a characteristic impedance larger than the characteristic impedance of the section of ridge waveguide which includes the ridge surface 118. As is indicated by FIGS. 2A and 2B, the characteristic impedance of the shorted waveguide tuning cavity is increased by reducing the height and width of ridge surface 142 relative to ridge surface 118.

With respect to the "fixed" and "rotating" open-circuited coaxial lines partially defined by the bored surfaces 135 and 153, respectively, it has been found that desired tuning characteristics may be achieved by:

(i) selecting the length of each open-circuited line to be less than λ/4, where λ denotes the wavelength of the predefined center carrier frequency, and (ii) designing each open-circuited line such that variation in its input impedance ($Z_{in,oc}$) as a function of frequency compensates for corresponding variation in the reactance of the associated shorted waveguide section over the frequency range of interest. The desired variation in ($Z_{in,oc}$) over the frequencies of interest may be achieved by selecting the characteristic impedance and length of the open-circuited line, in accordance with established principles of microwave circuit design. See, e.g., "The Compensated Balun", by George Oltman; IEEE TRANSACTIONS ON MICROWAVE THEORY AND TECHNIQUES, Vol. MTT-14, No. 3 (March 1966); pp. 112–117. In an exemplary embodiment operative over the 3.7 to 6.4 GHz frequency range, the "fixed" and "rotating" open-circuited lines partially defined by the bores 135 and 153 will preferably be dimensioned as set forth below in TABLE I.

TABLE I

| Parameter | Value |
| --- | --- |
| FIXED LINE | |
| Outer diameter of dielectric sleeve 134 | 0.106″ |
| Inner diameter of dielectric sleeve 134 | 0.050″ |
| Diameter of cylindrical bore 135 | 0.108″ |
| Coaxial line length* | 0.245″ |
| Characteristic Impedance | 33 Ω |
| ROTATING LINE | |
| Outer diameter of dielectric sleeve 152 | 0.094″ |
| Inner diameter of dielectric sleeve 152 | 0.050″ |
| Diameter of cylindrical bore 153 | 0.096″ |
| Coaxial line length** | 0.251″ |
| Characteristic Impedance | 28 Ω |

*Denotes the vertical separation between the inner waveguide surface 116 and the end 144 of the transmission line 112.
**Denotes the vertical separation between the ridge waveguide surface 118 and the end 158 of the transmission line 122.

The invention provides a somewhat similar technique for establishing the equivalent of an electrical short circuit between the second coaxial transmission line 122 and the ridged waveguide. An impedance matching circuit is provided which includes:

(i) a short-circuited ridge waveguide section comprising a second tuning cavity defined by the third ridge surface 154, by a waveguide end wall surface 160, and by the cover 117, and (ii) the second open-circuited coaxial section partially defined by bored surface 153.

The impedance matching circuit is designed to tune out impedance mismatch between the second inner conductor 148 and the ridge surface 118 arising, for example, from the inductance associated with the section of the second inner conductor 148 extending through the waveguide propagation space. Again, the second open-circuited coaxial section is designed such that variation in its input impedance over frequency results in compensation of corresponding variation in the reactance of the second tuning cavity.

Referring to FIGS. 2A and 2B, a "short choke" section of coaxial transmission line is seen to consist of the second outer conductor 126 and an annular portion 164 of the waveguide cap 117. In this regard the outer surface of the conductor 126 serves as an inner conductor of the short choke section, while the annular portion 164 comprises the outer conductor. The short choke is designed to enable the formation of a non-contacting electrical connection, i.e., an electrical short, between the outer conductor 126 of transmission line 122 and the ridged waveguide cover conductor 117. Specifically, in the preferred embodiment the short choke is designed to appear as a small series capacitive reactance in series with transmission line 122. The capacitive reactance of the short choke, in conjunction with the second tuning cavity, allow a non-contacting electrical connection to be established between the outer conductor 126 and the waveguide cover 117.

Figure 1:
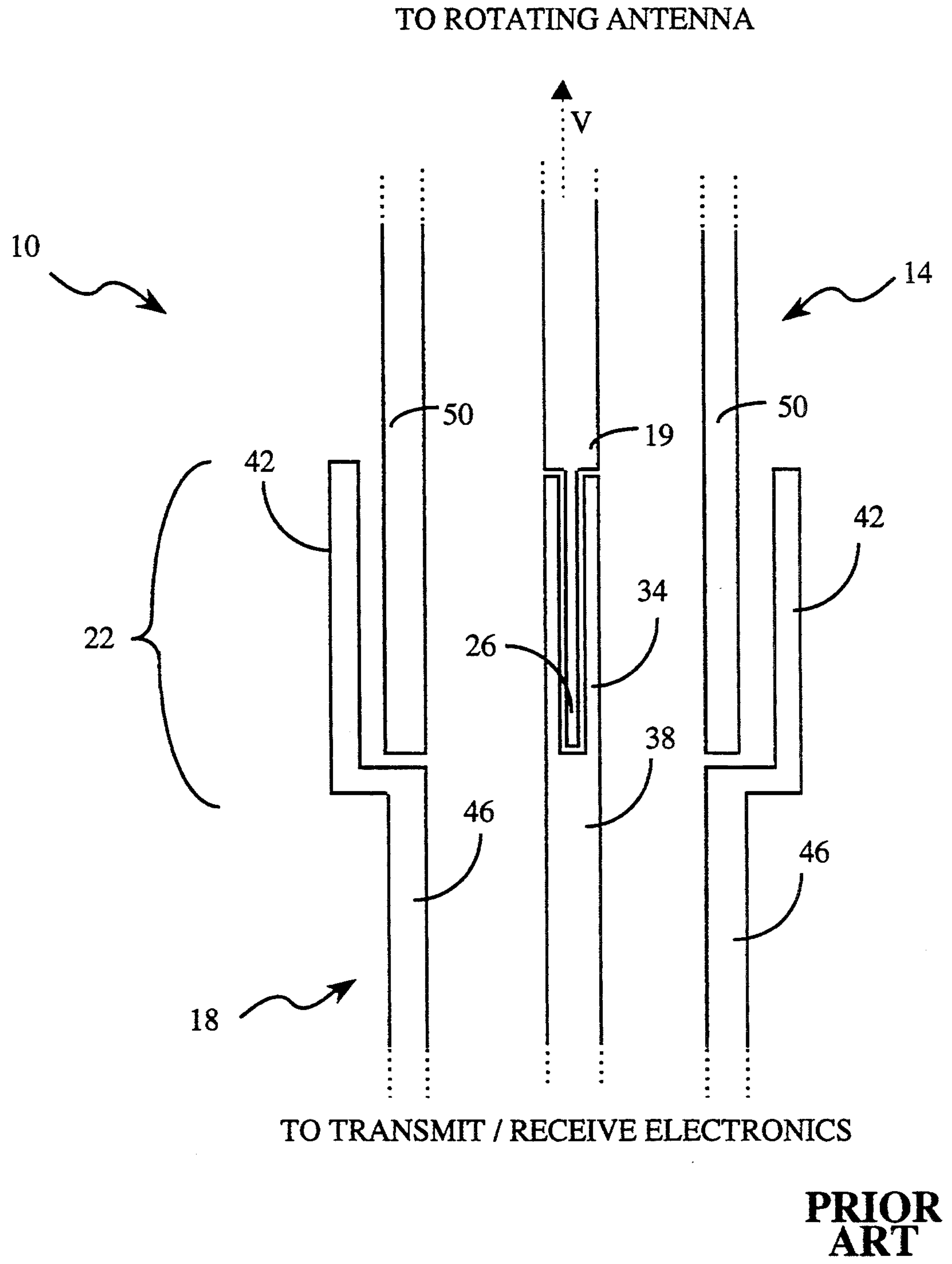
FIG. 1 shows a cross-sectional view of a conventional rotary joint.

As is discussed below, the short choke is made to exhibit an impedance corresponding to a capacitive reactance by designing the annular portion 164 to extend, in the vertical direction parallel to the axis V, a length L significantly less than a quarter-wavelength of a predefined signal carrier (e.g. $L \approx \lambda/8$). The term "short choke" is thus employed so as to differentiate this structure from conventional coaxial chokes (FIG. 1), which extend a quarter-wavelength in the axial direction. Hence, the short choke section allows realizations of the rotary joint of the invention having compact axial dimensions.

The magnitude of the capacitive reactance introduced by the short choke may be found by first determining its characteristic impedance ($Z_{o,sc}$), with ($Z_{o,sc}$) being expressed as:

$$Z_{o,sc} = 60/E_r \{\ln (D_{out}/D_{in})\} \quad (1)$$

In equation (1) the parameter $E_r$ identifies the relative dielectric constant of air ($\approx 1$), and the notations $D_{out}$ and $D_{in}$ refer to the outer and inner diameters of the short choke section, respectively. The outer diameter $D_{out}$ is defined by the inner surface of annular portion 164, while the inner diameter $D_{in}$ is defined by the outer surface of conductor 126. In the preferred embodiment $Z_{o,sc}$ is made to be as small as is practical by selecting $D_{out}$ to be only slightly larger than $D_{in}$. For example, for $D_{out} = 0.397''$ and $D_{in} = 0.375''$, the value of $Z_{o,sc}$ is approximately 3.4Ω. For a center carrier frequency of 5.0 GHz ($\lambda \approx 2.36''$), a short choke length L of 0.35″ (where $L < \lambda/4 \approx 0.59''$), the corresponding input impedance presented by the short choke ($Z_{in,sc}$) to the ridged waveguide is given by:

$$Z_{in,sc} \approx -j(3.4\Omega) \cot \{(0.35/2.36)360\} \approx -j2.5\Omega \quad (2)$$

Equation (2) holds true under the condition that an impedance approximating an open circuit exists at the output of the short choke. In the embodiment of FIGS. 2A and 2B such an open circuit is provided by a chamber defined primarily by the outer surface of conductor 126, the outer surface 168 of annular portion 164, and by an inner surface 172 of flange 130.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

We claim:

1. A coaxial-waveguide assemblage, comprising:

a first coaxial transmission line having a first inner and a first outer conductor;

a waveguide, electromagnetically coupled to said first coaxial transmission line, said waveguide having an inner surface bounding a signal propagation space;

a second coaxial transmission line electromagnetically coupled to said waveguide, said second coaxial transmission line having a second inner and a second outer conductor and being disposed to rotate about a first vertical axis; and said signal propagation space extending between said first and second coaxial transmission lines.

2. The assemblage of claim 1 wherein said first coaxial transmission line includes a first axially elongated dielectric sleeve disposed about said first inner conductor and extending into said propagation space.

3. The assemblage of claim 2 wherein a first end of said first outer conductor defines a first waveguide aperture upon said inner surface of said waveguide.

4. The assemblage of claim 3 wherein said inner surface of said waveguide defines a second waveguide aperture through which protrudes said second inner conductor of said second coaxial transmission line.

5. The assemblage of claim 4 wherein said second transmission line includes a second axially elongated dielectric sleeve disposed about said second inner conductor.

6. The assemblage of claim 5 further including bearing means, said bearing means contacting an outer surface of said second outer conductor, for facilitating rotation of said second transmission line about said vertical axis.

7. The assemblage of claim 1 wherein said inner surface of said waveguide defines a ridge transverse to said first vertical axis.

8. The assemblage of claim 7 wherein said ridge is of a first height between said first and second inner conductors and is of a second height between said first inner conductor and a first end of said waveguide.

9. The assemblage of claim 7 wherein said inner surface of said waveguide defines a first bore within an upper conductor of said waveguide, said first inner conductor extending into said bore so as to form a first open-circuited section of coaxial transmission line.

10. The assemblage of claim 7 wherein said inner surface of said waveguide defines a second bore within said ridge of said waveguide, said second inner conductor extending into said bore so as to form a second open-circuited section of coaxial transmission line.

11. The assemblage of claim 9 wherein said inner surface of said waveguide defines a second aperture in said upper conductor of said waveguide opposite said ridge of said waveguide, said second inner conductor protruding through said second aperture into said propagation space.

12. The assemblage of claim 1 wherein said second transmission line includes an axially elongated dielectric sleeve interposed between said second inner and outer conductors, said second inner conductor and said axially elongated dielectric sleeve extending into said propagation space.

13. The assemblage of claim 1 further including a short choke tuning member, said short choke tuning member being defined by an annular surface circumscribing a section of said second outer conductor, said annular surface being electrically connected to said inner surface of said waveguide.

14. The assemblage of claim 13 wherein said section of said second outer conductor extends less than a quarter of a predefined carrier wavelength in a direction parallel to said vertical axis.

15. A coaxial-waveguide rotary joint assemblage for coupling electromagnetic energy between first and second signal ports, comprising:

a first coaxial transmission line connected to said first signal port, said first coaxial transmission line having a first inner and a first outer conductor;

a waveguide, electromagnetically coupled to said first coaxial transmission line, said waveguide having an inner surface defining a first ridge of a first height and a second ridge of a second height;

a second coaxial transmission line connected to said second signal port and rotatable about a vertical axis relative to said first transmission line, said second coaxial transmission line being electromagnetically coupled to said waveguide, said second coaxial transmission line having a second inner and a second outer conductor; and a bearing arrangement, interposed between said second outer conductor and said first outer conductor, for facilitating rotation of said second coaxial transmission line about said vertical axis.

16. The rotary joint assemblage of claim 15, wherein said waveguide defines a propagation space and said second transmission line includes an axially elongated dielectric sleeve disposed about said second inner conductor, said axially elongated dielectric sleeve extending into said propagation space through a waveguide aperture defined by said inner surface of said waveguide.

17. The rotary joint assemblage of claim 16 further including a short choke tuning member, said short choke tuning member defining an annular surface circumscribing a section of said second outer conductor proximate said waveguide aperture.

18. The rotary joint assemblage of claim 17 wherein said section of said second outer conductor extends less than a quarter of a predefined carrier wavelength in a direction parallel to said vertical axis.

19. The rotary joint assemblage of claim 15 wherein said inner surface bounds a propagation space and has an end wall, and said second ridge is included within a tuning cavity defined by said inner surface of said waveguide, said tuning cavity being interposed between a section of said inner conductor extending into said waveguide propagation space and said end wall of said waveguide.

* * * * *